US007060904B2

(12) United States Patent
Ozai et al.

(10) Patent No.: US 7,060,904 B2
(45) Date of Patent: Jun. 13, 2006

(54) CABLE CONNECTING STRUCTURE FOR ELECTRICAL CONNECTOR

(75) Inventors: Kazuyuki Ozai, Shinagawa-Ku (JP); Shinya Ishizuka, Shinagawa-Ku (JP)

(73) Assignee: DDK Ltd., Tokyo (JP)

( * ) Notice: Subject to any disclaimer, the term of this patent is extended or adjusted under 35 U.S.C. 154(b) by 0 days.

(21) Appl. No.: 10/712,903

(22) Filed: Nov. 13, 2003

(65) Prior Publication Data

US 2004/0152363 A1 Aug. 5, 2004

(30) Foreign Application Priority Data

Jan. 30, 2003 (JP) ............................ 2003-022402

(51) Int. Cl.
*H02G 15/02* (2006.01)

(52) U.S. Cl. .................... 174/74 R; 174/74 A; 174/76; 174/79

(58) Field of Classification Search .............. 174/74 R, 174/74 A, 76, 79; 439/493, 494, 499, 604, 439/607, 660
See application file for complete search history.

(56) References Cited

U.S. PATENT DOCUMENTS 4,149,026 A * 4/1979 Fritz et al. .................... 174/32
4,188,714 A * 2/1980 Jean ............................ 29/827
4,413,028 A * 11/1983 Diaz .......................... 428/35.1
4,443,657 A * 4/1984 Hill et al. ............. 174/110 FC
4,516,822 A * 5/1985 Wolfel ......................... 439/468
4,767,891 A * 8/1988 Biegon et al. ................ 174/34
4,815,981 A * 3/1989 Mizuno ....................... 439/77
4,923,410 A * 5/1990 Suzuki ....................... 439/492
4,927,388 A * 5/1990 Gutter ........................ 439/660
5,766,025 A * 6/1998 Davis .......................... 439/660
5,767,442 A * 6/1998 Eisenberg et al. ............ 174/36
6,354,878 B1 * 3/2002 Kropa et al. ................ 439/610
6,580,034 B1 * 6/2003 Daane et al. ............ 174/117 F
6,793,537 B1 * 9/2004 Stefaniu et al. ............. 439/660
2002/0002005 A1 * 1/2002 Whybrow ................... 439/625

* cited by examiner

*Primary Examiner*—William H. Mayo, III
(74) *Attorney, Agent, or Firm*—Baker Botts LLP

(57) ABSTRACT

A cable connecting structure for connecting a cable including cable cores each having a core conductor and a core sheath to an electrical connector in which the leading end of the cable is peeled to expose the core conductors of the cable cores and the exposed core conductors are connected to contacts of the electrical connector. A dielectric member having air contained therein is arranged to cover at least part of the exposed portions of the cable cores of the cable. With this construction, it is possible to restrain characteristic impedances at the exposed portions of the cable cores, which tend to become higher.

5 Claims, 2 Drawing Sheets

CABLE CONNECTING STRUCTURE FOR ELECTRICAL CONNECTOR

BACKGROUND OF THE INVENTION

The present invention relates to a cable connecting structure for an electrical connector for connecting a cable including cable cores each having a core conductor and a core sheath to respective contacts of the electrical connector with exposed core conductors of the cable cores by peeling leading end of the cable, and more particularly to a connecting structure for connecting a cable to an electrical connector, which is able to restrain characteristic impedance which tends to be higher at exposed portions of cable cores with the result of reduction in variances of the characteristic impedance over the length of the cable including the exposed portions of cable cores of the cable, thereby improving its transmission efficiency.

With an electrical connector for a cable including cable cores each having a core conductor and a core sheath, in general, the leading end of the cable is peeled to expose the core conductors of the cable cores, and the exposed core conductors are connected to contacts of the electrical connector.

Matching of characteristic impedance is generally required over the length of a cable as a transmission passage with a view to obtaining improvement in transmission efficiency and the like. If the transmission passage includes portions poor in matching of characteristic impedance, problems would tend to arise such as reduction in transmission efficiency and occurrence of noise due to reflection of signals at the portions.

In order to connect a cable to an electrical connector, however, it is needed to expose conductors of cable cores of the cable by peeling its leading end. Therefore, the exposed portions of the cable cores, in more detail, the exposed portions of both the core conductors and core sheaths exhibit inevitably lower dielectric constants $\epsilon_r$ than those of the remaining portions of the cable not being peeled or exposed, with the result that the characteristic impedances of the exposed portions tend to become higher.

A prior art proposal has attempted to lower the characteristic impedance $Z_O$ of the exposed portions. In the proposal, after the exposed portions connected to contacts of an electrical connector have been set in a metal die, the die is filled with molten resin which is then solidified, whereby the exposed portions are embedded in the solidified resin.

Even with this prior art proposal, it is difficult to achieve substantially same value of the characteristic impedance over the length of a cable owing to the fact that the characteristic impedance $Z_O$ of the exposed portions becomes higher to an excessive extent due to the high dielectric constant $\epsilon_r$ of the solidified resin. Moreover, the operation for solidifying the molten resin is time-consuming and the metal die used for covering the exposed portions by the resin increases the manufacturing cost. Therefore, this prior art proposal is not preferable in view of its efficiency and cost.

Accordingly, there is a need for a convenient method for reducing the characteristic impedance $Z_O$ of the exposed portions of cable cores to the desired value.

SUMMARY OF THE INVENTION

It is an object of the invention to provide a cable connecting structure for an electrical connector, which is intended to restrain characteristic impedance tending to be higher at exposed portions of cable cores of a cable, thereby minimizing variances in characteristic impedance over the length of the cable including the exposed portions of the cable cores to improve its transmission efficiency.

In order to achieve the above object, in a cable connecting structure for an electrical connector for connecting a cable including cable cores each having a core conductor and a core sheath to respective contacts of the electrical connector with exposed core conductors of the cable cores by peeling leading end of the cable, the cable connecting structure according to the invention comprises a dielectric member having air contained therein arranged to cover at least part of the exposed portions of the cable cores of the cable.

In preferred embodiments of the invention, the dielectric member has a dielectric constant within a range of 1.5 to 4.5 and covers at least core conductors of exposed portions of cable cores of the cable. The dielectric member is preferably formed of polystyrene foam, polytetrafluoro-ethylene foam (PTFE), urethane, sponge or the like.

Preferably, the dielectric member is provided by winding a sheet of a porous resin material about at least part of the exposed portions of the cable cores of the cable, or by embracing at least part of the exposed portions of the cable cores of the cable between two sheets of the porous resin material.

As can be seen from the above description, according to the invention the characteristic impedance is restrained which tends to become higher at the exposed portions of cable cores of the cable to minimize the variances in characteristic impedance over the length of the cable including the exposed portions of the cable cores, thereby improving its transmission efficiency.

The invention will be more fully understood by referring to the following detailed specification and claims taken in connection with the appended drawings.

Figure 1:
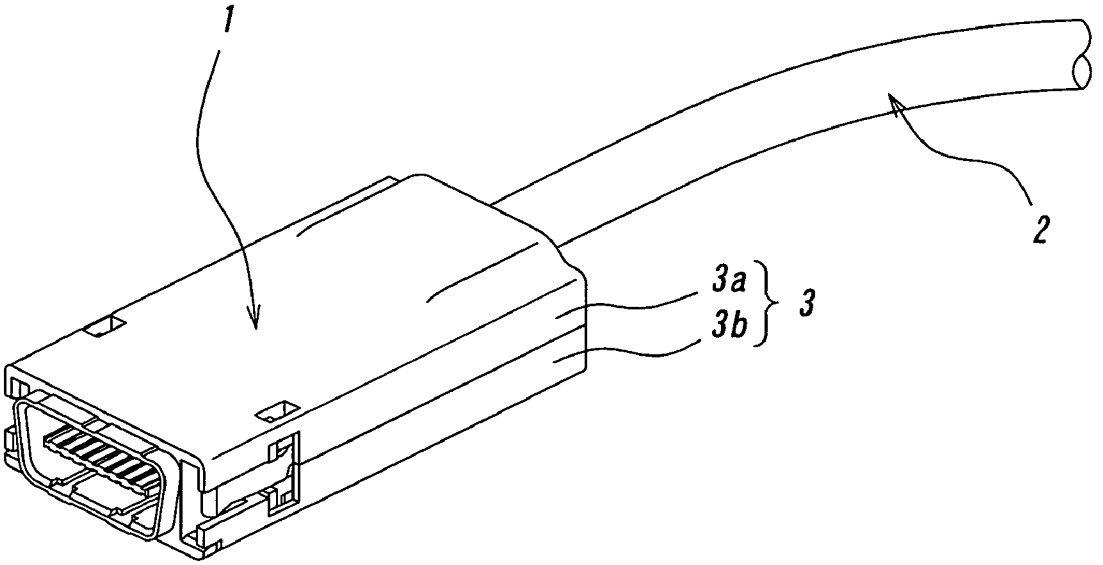
FIG. 1 is a perspective view of an electrical connector having a cable connecting structure according to the invention.
Figure 3A:
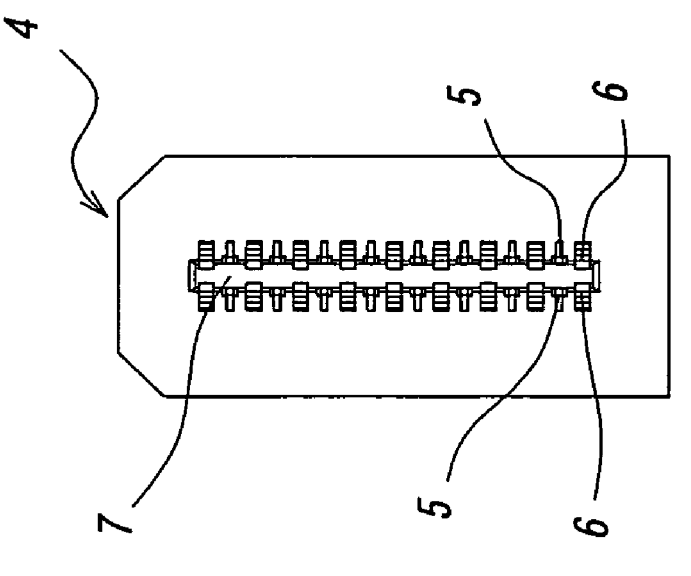

FIG. **3*a* is a side view of the main body of the connector shown in FIG. 1** as seen from the left;

FIG. **3*b* is a plan view of the main body shown in FIG. 3*a***; and

FIG. **3*c*** is a side view of the main body of the connector as seen from the right.

DESCRIPTION OF THE PREFERRED EMBODIMENTS

Figure 2:
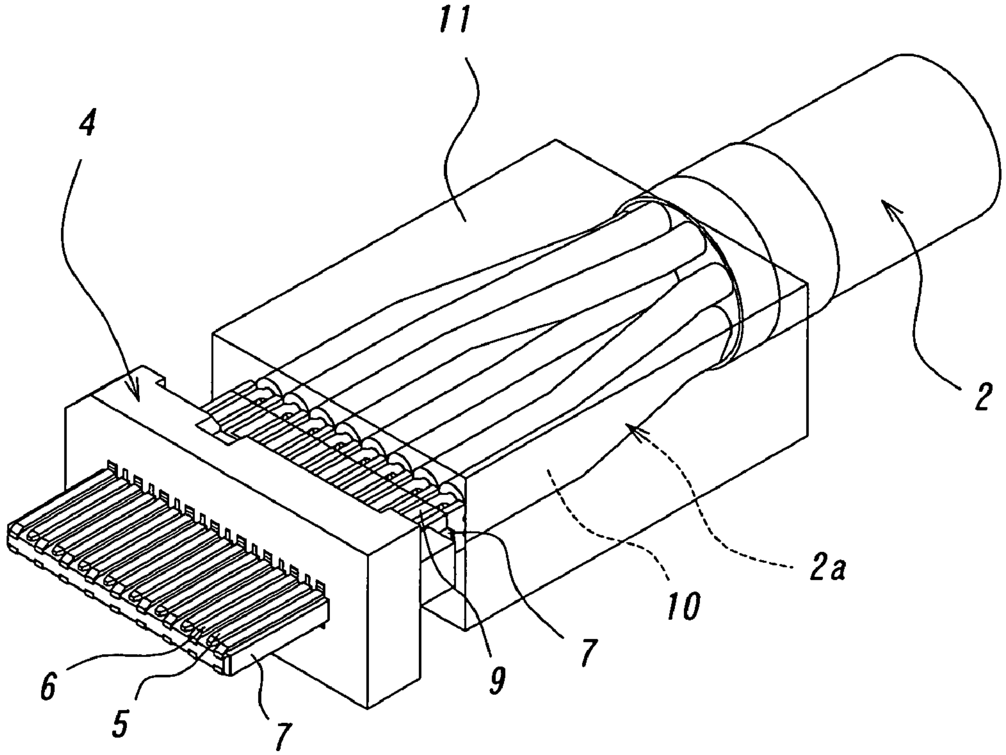
FIG. 2 is an enlarged perspective view of the electrical connector shown in FIG. 1 with the hood removed to illustrate the cable connecting structure according to the invention.

FIG. 1 illustrates a cable connecting structure according to the present invention for connecting a cable 2 to an electrical connector 1 received in a hood 3. FIG. 2 shows the electrical connector 1 with the hood 3 removed to expose the connecting structure for connecting the cable 2 to the electrical connector 1.

The electrical connector 1 shown in FIG. 1, which is a fitting type plug connector, consists mainly of a connector main body 4. (FIG. 3) and a hood 3 formed, for example, by die casting from zinc. As shown in FIG. 1, the hood 3 consists of an upper hood member **3*a* and a lower hood member 3*b* to be assembled and disassembled. When the electrical connector 1 is being assembled, the upper and lower hood members 3***a* and 3*b* are clamped together as by flat head screws (not shown).

Figure 3B:
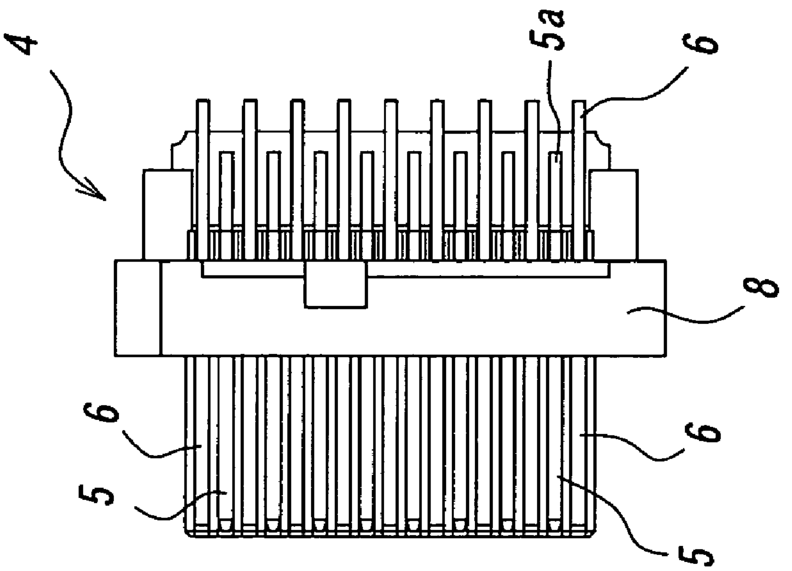
Figure 3C:
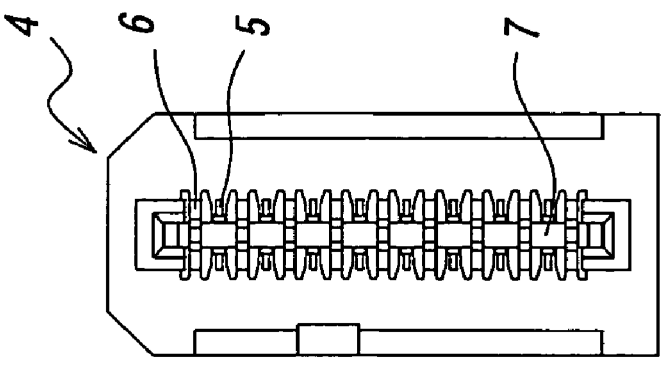

As shown in FIGS. 3*a*, 3*b* and 3*c*, the connector main body 4 consists mainly of a plate 7 made of an insulating material on which signal contacts 5 and ground contacts 6 made of a conductor, for example, a plated copper alloy are alternately arranged and spaced apart from one another, and a housing 8 made of an insulating material for fixing the plate 7 passing through the housing 8.

The electrical connector 1 shown in FIG. 2 serves to connect the cable 2 having eight cable cores 2*a* (two-core covered cords). Each of the eight cable cores 2*a* consists of core conductors 9 and a core sheath 10. The leading end of the cable 2 is peeled to expose core conductors 9 of the cable cores 2*a*, which are then connected as by spot welding or soldering to connection portions 5*a* of the sixteen signal contacts 5, respectively, eight of which are provided on the upper surface of the plate 7 as viewed in FIG. 2 and the remaining eight signal contacts 5 being provided on the lower surface of the plate 7. Between these eight signal contacts 5 are disposed the ground contacts 6, the number of ground contacts 6 being nine because there are two outermost ground contacts 6 located outside of the eight signal contacts 5.

Moreover, the plate 7 and the housing 8 are preferably made of an insulating material of ceramics or heat resisting resin, for example, liquid crystal polymer (LCP), polyphenylene sulfide (PPS), polyamide (PA) as represented by nylon 46 and nylon 66 and the like.

Forming the main constitutional characterizing feature according to the invention is a dielectric member 11 containing air arranged to cover at least part of the exposed portions of the cable cores 2*a*. With this feature according to the invention, it becomes possible to restrain the characteristic impedance at the exposed portions of the cable cores 2*a* which tends to become problematically higher. Accordingly, a reduction can be achieved as much as possible in variances in characteristic impedance over the length of the cable 2 including the exposed portions of the cable cores 2*a*, thereby improving the transmission efficiency and the like.

Preferably, the dielectric member 11 has a dielectric constant within a range of 1.5 to 4.5. If the dielectric constant is outside of the above range, there is a risk that sufficient impedance matching cannot be obtained even with the use of the dielectric member 11. The dielectric constant of the dielectric member 11 is more preferably 1.5 to 2.5, which substantially approximates to that of the covering material of relevant cable.

The dielectric member 11 is preferably placed on the exposed portions of the cable cores to cover at least the core conductors. Preferred materials from which to form the dielectric member 11 include porous resins materials such as polystyrene foam, polytetrafluoro-ethylene foam (PTFE), urethane, sponge and the like. In placing the dielectric member 11, a sheet of a porous resin material described above may be wound about at least part of the exposed portions of the cable cores 2*a*. In an alternative, at least part of the exposed portions of the cable cores 2*a* may be embraced by two sheets of a porous resin material. The latter method is preferable because it is inexpensive and easy in operation.

Electrical connectors each having the cable connecting structure for connecting a cable to the electrical connector according to the invention were experimentally manufactured and their performances of characteristic impedance were estimated. Simultaneously therewith, for the purpose of comparing with the invention, experimentally manufactured were prior art cable connecting structures not covering exposed portions of cable cores or covering exposed portions with solid resin.

Measured were performances of these experimentally manufactured cable connecting structures. With the prior art electrical connectors, differences in characteristic impedance between the exposed portions of the cable cores and the remaining portions of the cables ranged from 15 to 25 Ω. In contrast herewith, in the cable connecting structures according to the invention, differences in characteristic impedance between the exposed portions of the cable cores and the remaining portions of the cables were in the range from 3 to 8 Ω, which is remarkably less than that in the prior art structures.

While the invention has been particularly shown and described with reference to preferred embodiments thereof, it will be understood by those skilled in the art that the foregoing and other changes in form and details can be made therein without departing from the scope of the invention mentioned in claims. Particularly, as forming the important aspect of the present invention is the cable connecting structure for connecting a cable to an electrical connector, various constructions of electrical connectors and cables are possible without being limited to their particular constructions.

What is claimed is:

1. A structure for connecting an electrical connector to a cable, said cable including cable cores each having a core conductor and an insulating core sheath, wherein the core conductors of the cable cores are exposed by peeling a leading end of said cable, including portions of said insulating core sheaths, and connected to respective contacts of the electrical connector, said structure comprising a dielectric member made from a porous resin material, said dielectric member containing an air-filled cavity housing at least part of the exposed portions of said cable cores of the cable, wherein said dielectric member has a dielectric constant within a range of 1.5 to 4.5.

2. The cable connecting structure for an electrical connector as set forth in claim 1 wherein said dielectric member is arranged to cover at least the core conductors of the exposed portions of the cable cores.

3. The cable connecting structure for an electrical connector as set forth in claim 1 wherein said dielectric member is provided by winding a sheet of said porous resin material about at least part of the exposed portions of said cable cores of the cable.

4. The cable connecting structure for an electrical connector as set forth in claim 1 wherein said dielectric member is provided by embracing at least part of the exposed portions of said cable cores of the cable between two sheets of said porous resin material.

5. The cable connecting structure for an electrical connector as set forth in claim 1 wherein said porous resin material is selected from a group consisting of polystyrene foam, polytetrafluoro-ethylene foam (PTFE), urethane, sponge and the like.

* * * * *